(12) United States Patent
Jeong

(10) Patent No.: US 11,691,523 B2
(45) Date of Patent: Jul. 4, 2023

(54) CHARGING COUPLER HAVING HANDLE AND ELECTRONIC VEHICLE CHARGING APPARATUS INCLUDING THE SAME

(71) Applicant: DAE YOUNG CORETECH CO., LTD, Daegu (KR)

(72) Inventor: Tae Ho Jeong, Daegu (KR)

(73) Assignee: DAE YOUNG CORETECH CO., LTD, Daegu (KR)

( * ) Notice: Subject to any disclaimer, the term of this patent is extended or adjusted under 35 U.S.C. 154(b) by 258 days.

(21) Appl. No.: 16/808,318

(22) Filed: Mar. 3, 2020

(65) Prior Publication Data

US 2021/0053452 A1 Feb. 25, 2021

(30) Foreign Application Priority Data

Aug. 19, 2019 (KR) .................. 10-2019-0101396

(51) Int. Cl.
*B60L 53/16* (2019.01)
*B60L 53/18* (2019.01)

(52) U.S. Cl.
CPC .............. *B60L 53/16* (2019.02); *B60L 53/18* (2019.02)

(58) Field of Classification Search
CPC ................................ B60L 53/16; B60L 53/18
USPC ........................................................ 320/109
See application file for complete search history.

(56) References Cited

U.S. PATENT DOCUMENTS

| 635,815 | A | * | 10/1899 | Sperry | .................... | A63H 19/10 |
| | | | | | | 74/486 |
| 2012/0129378 | A1 | * | 5/2012 | Kiko | ........................ | B60L 53/16 |
| | | | | | | 362/555 |
| 2014/0021915 | A1 | * | 1/2014 | Staley | ........................ | H02J 7/00 |
| | | | | | | 439/153 |
| 2018/0272880 | A1 | * | 9/2018 | Bianco | ..................... | B60L 53/16 |
| 2022/0234455 | A1 | * | 7/2022 | Fuehrer | ................... | B60L 53/16 |

FOREIGN PATENT DOCUMENTS

| CN | 106848718 | A | * | 6/2017 | |
| CN | 107901780 | A | * | 4/2018 | |
| CN | 108454443 | A | * | 8/2018 | .............. B60L 53/16 |
| CN | 108454444 | A | * | 8/2018 | |
| CN | 108551022 | A | * | 9/2018 | |
| CN | 108598774 | A | * | 9/2018 | .............. B60L 53/16 |
| CN | 109361101 | A | * | 2/2019 | ........... H01R 13/502 |
| CN | 110481359 | A | * | 11/2019 | |
| CN | 111619375 | A | * | 9/2020 | .............. B60L 53/00 |
| CN | 111660842 | A | * | 9/2020 | |
| CN | 112186427 | A | * | 1/2021 | .............. B60L 53/16 |

(Continued)

*Primary Examiner* — Suresh Memula
(74) *Attorney, Agent, or Firm* — Broadview IP Law, PC

(57) ABSTRACT

Disclosed herein are an electric vehicle charging coupler having a handle and an electric vehicle charging apparatus including the same. The electric vehicle charging coupler includes a coupler body having one side on which a charging port to be mounted to a charging port of an electric vehicle is formed to perform charging, a cable inlet part which is formed in an upper portion of the coupler body and into which a charging cable is inserted, and a handle formed to extend from the other side of the coupler body to be held by a hand and provided separately from the cable inlet part. Therefore, the electric vehicle can be easily charged by easily handling the thick and heavy charging cable.

8 Claims, 4 Drawing Sheets

(56) References Cited

FOREIGN PATENT DOCUMENTS

| | | | | |
|---|---|---|---|---|
| CN | 110768054 B | * | 9/2021 | ............... B60L 53/16 |
| CN | 114103694 A | * | 3/2022 | |
| DE | 102010017458 A1 | * | 12/2011 | .......... B60L 11/1818 |
| DE | 102017103842 A1 | * | 8/2018 | .......... B60L 11/1818 |
| DE | 102017118300 A1 | | 2/2019 | |
| DE | 102018100829 A1 | * | 7/2019 | |
| DE | 102018100830 A1 | * | 7/2019 | |
| EP | 0692849 A1 | * | 1/1996 | |
| EP | 0692849 A1 | | 1/1996 | |
| EP | 3312044 A | | 4/2018 | |
| EP | 3312044 A1 | * | 4/2018 | |
| EP | 3378694 A1 | * | 9/2018 | ............... B60L 53/14 |
| EP | 3511198 A1 | * | 7/2019 | ............... B60L 53/16 |
| EP | 3771045 A1 | * | 1/2021 | ............... B60L 53/16 |
| JP | H06236780 A | * | 8/1994 | |
| JP | 2011-98743 A | | 5/2011 | |
| JP | 2012050288 A | | 3/2012 | |
| JP | 2012-90408 A | | 5/2012 | |
| JP | 2012-205312 A | | 10/2012 | |
| JP | 2013-73878 A | | 4/2013 | |
| KR | 1020140067346 A | | 6/2014 | |
| KR | 101895550 B1 | | 10/2018 | |
| KR | 102205451 B1 | * | 1/2021 | |
| WO | WO-2021013954 A1 | * | 1/2021 | ............... B60L 53/16 |

* cited by examiner (a)  (b)

CHARGING COUPLER HAVING HANDLE AND ELECTRONIC VEHICLE CHARGING APPARATUS INCLUDING THE SAME

CROSS-REFERENCE TO RELATED APPLICATION

This application claims priority to and the benefit of Korean Patent Application No. 2019-0101396, filed Aug. 19, 2019, the contents of which is incorporated herein by reference in its entirety.

BACKGROUND

Field of the Invention

The present invention relates to an electric vehicle charging coupler having a handle and an electric vehicle charging apparatus including the same, and more particularly, to an electric vehicle charging coupler having a handle for easily mounting, when an electric vehicle is being charged, a charging coupler connected to a heavy and thick charging cable to a charging port of the electric vehicle, and an electric vehicle charging apparatus including the same.

Discussion of Related Art

Recently, as the severity of air pollution problems, such as fine dust and the like, increases, the use of electric vehicles is encouraged and the number of users is increasing. Thus, the number of electric vehicle charging stations for electric vehicle charging is increasing, and there is an increasing need for electric vehicle charging apparatuses installed in a small size in public institutions and the like and an increasing need for a home charging apparatus for charging an electric vehicle at home.

The electric vehicle charging apparatus for charging an electric vehicle requires a charging main body having a power supply module embedded therein, and a charging cable and a charging coupler for charging the electric vehicle with electricity supplied from the power supply module. When a user inserts the charging coupler into a charging port of the electric vehicle, the charging cable should be effortlessly handled. However, since a charging cable for fast and super-fast charging is inflexible, the user feels uncomfortable when handling the charging cable.

That is, in the case of the charging cable for fast and super-fast charging, since a high current should flow and thus a large amount of heat is generated and a high temperature is generated, a flow path through which a refrigerant flows for cooling is additionally embedded in the charging cable. Therefore, since the charging cable for fast and super-fast charging is not only thick in thickness but also low in flexibility, it is not easy to handle such as when pulling or bending the charging cable for charging.

When the charging cable for fast and super-fast charging is employed in the existing charging apparatus, a user should directly handle the charging cable such as transferring the charging cable according to a position of the charging port of the electric vehicle. However, since it is not easy to handle the charging cable for fast and super-fast charging due to a characteristic of the charging cable, inconvenience of the user is large. That is, since a location of a charging port is different for each electric vehicle and a thickness of the charging cable is large and flexibility thereof is low such that it is not easy to handle the charging cable, the user is inconvenienced. In particular, it is not easy for the transportation disadvantaged such as a disabled person, an elderly person, or a woman to insert the charging coupler into the charging port by pulling or bending the charging cable.

Therefore, when the charging cable for fast and super-fast charging is transferred to a position of the charging port of the electric vehicle and then the charging coupler is inserted into the charging port, there is a need to develop the charging coupler or the charging apparatus for charging the electric vehicle, in which a coupling position of the charging coupler and the charging port can be easily adjusted even by the transportation disadvantaged such as a disabled person, an elderly person, and a woman in addition to a general user by finely adjusting the charging cable vertically.

RELATED ART DOCUMENT

Patent Document (Patent Document 0001) Korean Patent Laid-Open Application No. 10-2018-0115963 (Oct. 24, 2018)

SUMMARY OF THE INVENTION

The present invention is directed to an electric vehicle charging coupler having a handle for easily mounting a charging coupler to a charging port of an electric vehicle by forming the handle separately from a cable inlet part through which a charging cable is inserted into the electric vehicle charging coupler, and an electric vehicle charging apparatus including the same.

According to an aspect of the present invention, there is provided an electric vehicle charging coupler including a coupler body having one side on which a charging port to be mounted to a charging port of an electric vehicle is formed to perform charging, a cable inlet part which is formed in an upper portion of the coupler body and into which a charging cable is inserted, and a handle formed to extend from the other side of the coupler body to be held by a hand and provided separately from the cable inlet part.

The handle may include a height adjustment button configured to move the charging coupler up or down, and a lock button configured to operate a locking mechanism when the charging coupler is mounted to the charging port of the electric vehicle.

According to another aspect of the present invention, there is provided an electric vehicle charging apparatus including a charging main body having a power supply module which is embedded therein to supply charging power to an electric vehicle, a charging cable configured to transmit direct current (DC) power supplied from the charging main body to the electric vehicle, a charging cable transfer member configured to transfer the charging cable to a charging port of the electric vehicle, and an electric vehicle charging coupler connected to a distal end of the charging cable and having a handle which is formed separately from a cable inlet part into which the charging cable is inserted.

The charging cable transfer member may include a canopy formed to cover an upper side of the charging main body, and an automatic reel which is movably installed on the canopy and on which the charging cable is wound. A height adjustment button may be provided in the electric vehicle charging coupler so as to move the electric vehicle charging coupler up or down by unwinding or winding the charging cable from or on the automatic reel.

Alternatively, the charging cable transfer member may include a mounting bracket mounted on an upper portion of the charging main body, a circular rail mounted on the mounting bracket, a driving body movably installed on the circular rail, and a height adjustment part connected to the charging cable and coupled to the driving body to be vertically ascendable and descendable. A height adjustment button is provided on the electric vehicle charging coupler so as to control the height adjustment part to vertically ascend and descend.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

In order to describe the present invention, operational advantages of the present invention, and objectives achieved by practicing the present invention, the present invention will be described with reference to exemplary embodiments that will be given below.

The terms used herein are employed to describe only specific embodiments and are not intended to limit the present invention. Unless the context clearly dictates otherwise, the singular form includes the plural form.

It should be understood that the terms "comprise," "include," and "have" specify the presence of stated herein features, numbers, steps, operations, components, elements, or combinations thereof, but do not preclude the presence or possibility of adding one or more other features, numbers, steps, operations, components, elements, or combinations thereof.

In the following description of the present invention, when a detailed description of related known configurations or functions is determined to obscure the gist of the present invention, the detailed description thereof will be omitted.

Hereinafter, an electric vehicle charging coupler having a handle and an electric vehicle charging apparatus including the same according to exemplary embodiments of the present invention will be described in detail with reference to the accompanying drawings.

Figure 1:
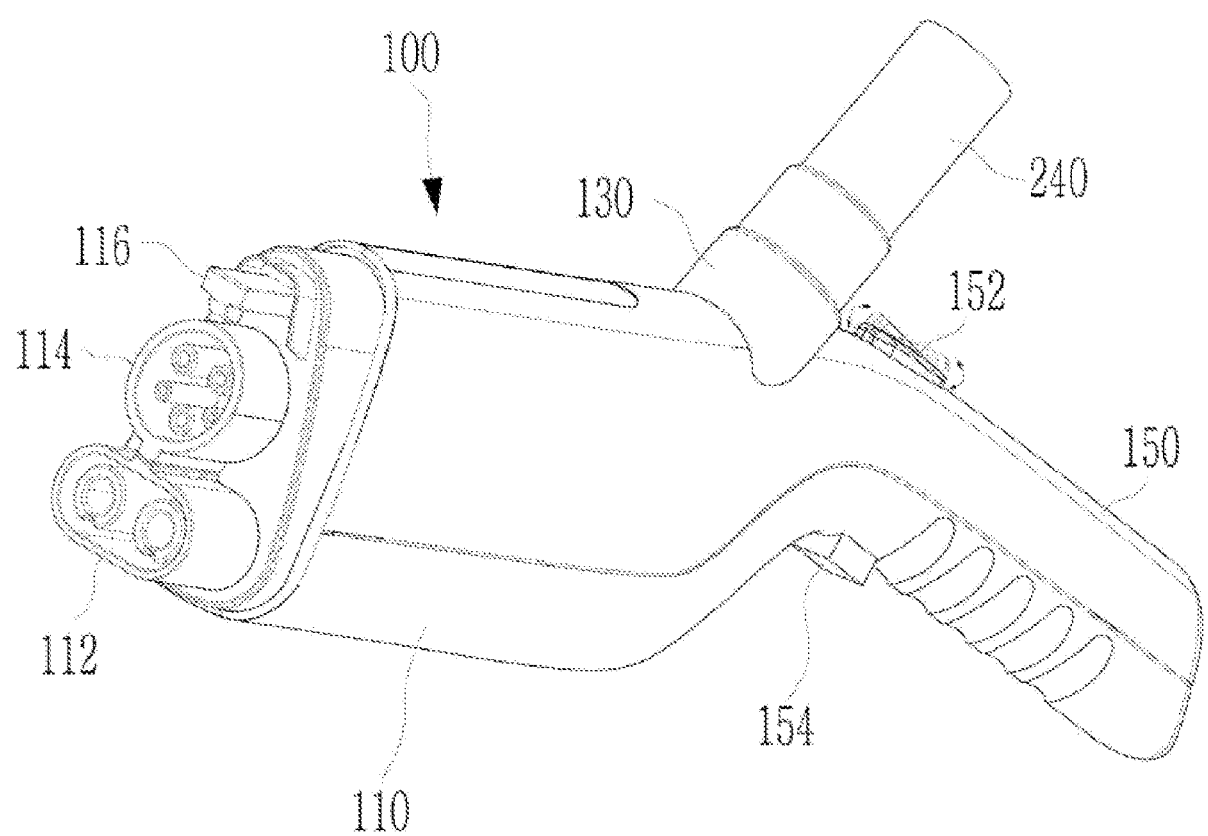
FIG. 1 is a diagram illustrating a configuration of an electric vehicle charging coupler according to one embodiment of the present invention.

FIG. 1 is a diagram illustrating a configuration of an electric vehicle charging coupler according to one embodiment of the present invention.

Referring to FIG. 1, a charging coupler 100 of the present invention includes a first port 112, a second port 114, and a locking mechanism 116 which are formed on a front surface of a coupler body 110 and includes a cable inlet part 130, through which a charging cable 240 is inserted, formed on a front surface of the coupler body 110. Further, the handle 150 which is holdable by a user is formed to extend from the coupler body 110 separately from the cable inlet part 130, and a height adjustment button 152 and a lock button 154 are provided on the handle 150.

The first port 112 is a direct current (DC) power charging port for fast charging and includes a plus (+) terminal and a minus (−) terminal.

The second port 114 is an alternating current (AC) power charging port for slow charging and includes two AC power terminals, a proximity sensing terminal, a ground (GND) terminal, and a communication terminal for communicating with an electric vehicle.

When the charging coupler 100 is mounted to a charging port of the electric vehicle, the locking mechanism 116 fixes the charging coupler 100 to the charging port so as to prevent the charging coupler 100 from being released from the charging port. The locking mechanism 116 is vertically pivotable due to an operation of the lock button 154. When a user presses the lock button 154 while mounting the charging coupler 100 to the charging port, the locking mechanism 116 is pivoted upward, and, when the lock button 154 is released, the locking mechanism 116 returns to an original position thereof so that the charging coupler 100 is fixed to the charging port. In contrast, when the charging coupler 100 is detached from the charging port, a lock state of the lock button 154 is released when the lock button 154 is pressed so that the charging coupler 100 is separated from the charging port.

When the charging coupler 100 is mounted to the charging port of the electric vehicle, the locking mechanism 116 may prevent a connection state between the charging coupler 100 and the charging port from being loosened or prevent the connection state from being loosened due to an external impact, thereby achieving stable charging.

In the present invention, the charging cable 240 is installed to have a structure in which the charging cable 240 descends from an upper side, and the cable inlet part 130 is formed in an upper portion of the coupler body 110. Thus, the user may easily transfer the charging cable 240 to the charging port of the electric vehicle without lifting or bending the charging cable 240.

The handle 150 is formed at a side opposite to the front surface on which the first port 112 and the second port 114 are formed in the coupler body 110. That is, the handle 150 may be formed on one side of the coupler body 110 so as to insert the first port 112 and the second port 114, which are formed on the other side of the coupler body 110, into the charging port. The user may easily adjust a mounting angle of the charging coupler 100 by holding the handle 150 formed separately from the cable inlet part 130.

The height adjustment button 152 and the lock button 154 are provided on the handle 150. The height adjustment button 152 is formed on an upper portion of the handle 150 at a position operable by a thumb, and the lock button 154 is formed in a lower portion of the handle 150 at a position operable by an index finger.

When the user presses the height adjustment button 152, the charging coupler 100 ascends or descends. That is, the charging coupler 100 of the present invention is connected to a distal end of the charging cable 240, and when the height adjustment button 152 is pressed, the charging coupler 100 ascends or descends while the charging cable 240 ascends or descends due to a charging cable transfer part at the upper side.

More specifically, when a front side of the height adjustment button 152 is pressed, the charging coupler 100 descends while the charging cable 240 descends downward, and when a rear side of the height adjustment button 152 is pressed, the charging coupler 100 ascends while the charging cable 240 ascends upward. An operation of the height adjustment button 152 will be described in detail below with reference to FIGS. 2 and 4.

In one embodiment of the present invention, the charging coupler 100 of a DC combo method capable of performing both fast charging and slow charging has been described, but the present invention is not limited thereto. That is, the formation of each of the cable inlet part 130 and the handle 150 may be applied to all types of the charging coupler 100 for an electric vehicle.

According to the charging coupler 100 of the present invention, the user may easily mount the charging ports 112 and 114 to the charging port of the electric vehicle by holding the handle 150 and matching the charging ports 112 and 114 with a direction of the charging port of the electric vehicle without laboriously lifting the heavy and thick charging cable 240 to mount the charging coupler 100 to the charging port of the electric vehicle. Further, a charging height is finely adjusted by operating the height adjustment button 152 provided on the handle 150 and then the charging coupler 100 may be mounted to the charging port of the electric vehicle easily even with one hand.

Figure 2:
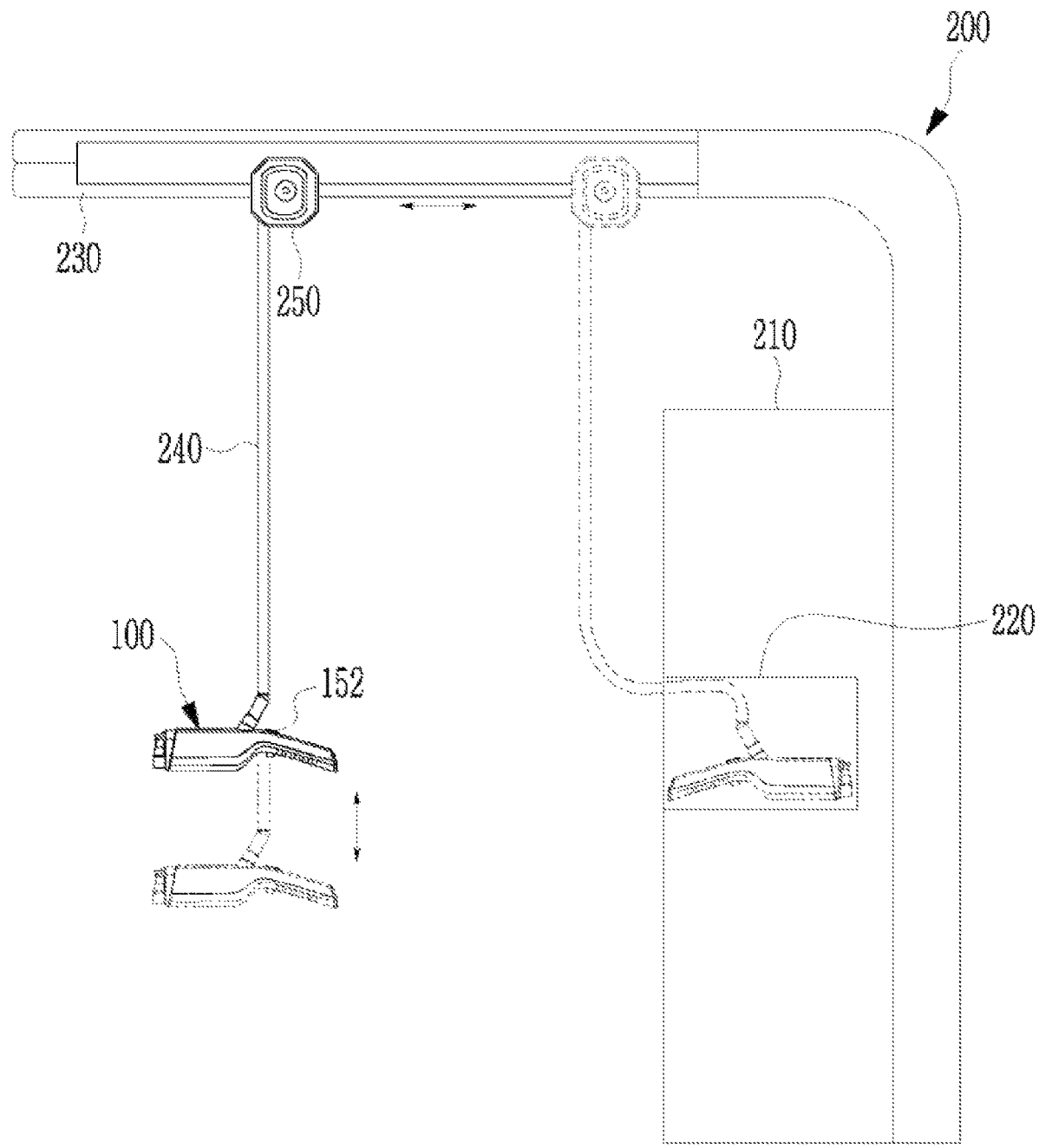
FIG. 2 is a schematic diagram illustrating a configuration of an electric vehicle charging apparatus including the electric vehicle charging coupler according to one embodiment of the present invention.

FIG. 2 is a schematic diagram illustrating a configuration of an electric vehicle charging apparatus including the electric vehicle charging coupler according to one embodiment of the present invention.

Referring to FIG. 2, an electric vehicle charging apparatus 200 of the present invention includes a charging main body 210, a canopy 230, an automatic reel 250, a charging cable 240, and a charging coupler 100.

The charging main body 210 is formed with a predetermined height and installed to stand on the ground. A power supply module for supplying charging power is embedded in the charging main body 210. That is, an AC/DC converter (not shown) for converting AC power into DC power is provided in the charging main body 210. The DC power converted in the AC/DC converter is supplied to charge a battery of the electric vehicle. Alternatively, DC power converted through a separately provided DC/DC converter may be supplied for charging the electric vehicle.

A coupler accommodation box 220 is provided in the charging main body 210. When charging is not being performed, the charging coupler 100 is accommodated in the coupler accommodation box 220. In addition to a card reader (not shown) for paying a charging fee with a credit card, various buttons for controlling operations of the electric vehicle charging apparatus 200, such as a button (not shown) for selecting a charging type of the electric vehicle which will be charged, an emergency button (not shown) for interrupting charging in an emergency situation, and the like, are provided on a front surface of the charging main body 210.

The canopy 230 is formed to cover an upper side of the charging main body 210 and extends to an area in which the electric vehicle is parked. The automatic reel 250 on which the charging cable 240 is wound is installed on the canopy 230. As shown in FIG. 2, the automatic reel 250 is installed to be reciprocatably transferred between the charging main body 210 and the area in which the electric vehicle is parked.

Here, when a user holds and pulls the charging coupler 100 to perform charging, the automatic reel 250 is installed to be manually transferred in front of the electric vehicle which is parked or installed to be automatically transferred upon pressing of an automatic reel transfer button (not shown) provided on the front surface of the charging main body 210 by the user.

The charging cable 240 transmits the DC power supplied from the charging main body 210 to the electric vehicle. Since a high current passes through the charging cable 240 for fast charging and thus high heat is generated, a flow path through which a refrigerant for cooling flows is additionally embedded in the charging cable 240 so that the charging cable 240 becomes thick and heavy.

The thick and heavy charging cable 240 is easily transferred to a position of the charging port without a large effort due to the automatic reel 250 installed at the upper side. Further, since the charging cable 240 is installed to have a structure which descends from the upper side, the user may easily transfer the charging cable 240 to the charging port of the electric vehicle without lifting or bending the charging cable 240.

The charging cable 240 is wound on the automatic reel 250. When the charging cable 240 wound on the automatic reel 250 is unwound, the charging coupler 100 descends, and, when the charging cable 240 is wound on the automatic reel 250, the charging coupler 100 ascends.

The charging coupler 100 is connected to the distal end of the charging cable 240 and has the handle 150 which is formed separately from the cable inlet part 130 through which the charging cable 240 is inserted. A configuration of the charging coupler 100 is the same as that described with reference to FIG. 1, and, since the electric vehicle charging apparatus 200 illustrated in FIG. 2 is dedicated to DC power charging, only the communication terminal of the second port 114 of the charging coupler 100 is used.

The height adjustment button 152 is provided on the charging coupler 100 so as to move the charging coupler 100 up or down such that a height of the charging port of the electric vehicle is aligned with a height of the charging coupler 100. The user operates the height adjustment button 152 to finely adjust the height of the charging coupler 100 by unwinding the charging cable 240 wound on the automatic reel 250 or winding the charging cable 240 on the automatic reel 250. That is, it is possible to finely adjust the height of the charging coupler 100 according to a position of the charging port which is different in height for each electric vehicle by operating the height adjustment button 152.

Figure 3:
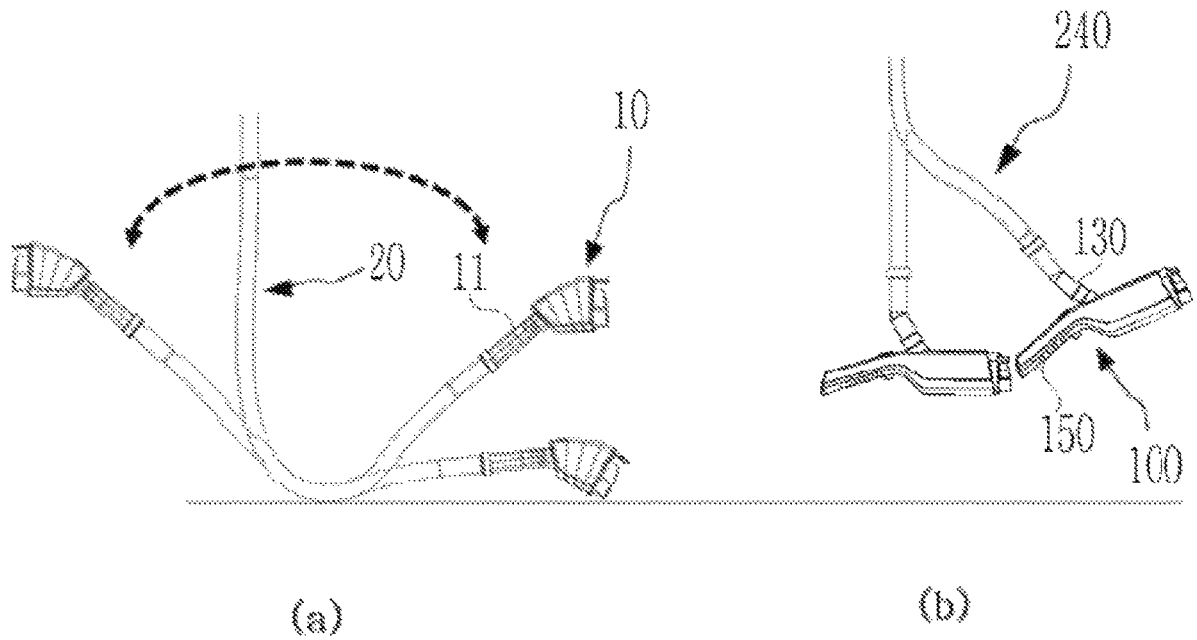
FIG. 3 is a diagram comparing the electric vehicle charging coupler according to one embodiment of the present invention with that of the related art.

FIG. 3 is a diagram comparing the electric vehicle charging coupler according to one embodiment of the present invention with that of the related art.

FIG. 3A illustrates a conventional electric vehicle charging coupler 10, and FIG. 3B illustrates the electric vehicle charging coupler 100 of the present invention.

In the conventional charging coupler 10, a charging cable 20 is connected to a cable inlet part 11, and the user uses the cable inlet part 11 as a handle. That is, the user should hold the cable inlet part 11 and pull the charging cable 20 to match the conventional charging coupler 10 to the charging port of the electric vehicle.

However, since the charging cable 20 for fast charging is heavy and lacking in flexibility, it is not easy to bend the charging cable 20 such that it is difficult to handle the charging cable 20 to be wound and the like. Further, when a length of the charging cable 20 is long, the charging cable 20 may fall from a mounting position to a floor and thus may be worn or damaged due to friction with the floor. As described above, when the charging cable 20 is damaged, there is a risk of electric shock and thus a safety problem may occur.

In the electric vehicle charging coupler 100 of the present invention, the handle 150 is formed separately from the cable inlet part 130, and the charging cable 240 is installed to have a structure which descends from the upper side. Therefore, the user may easily mount the charging coupler 100 to the charging port of the electric vehicle by holding the handle 150 only with one hand without bending the charging cable 240 which is heavy and has less flexibility.

Figure 4:
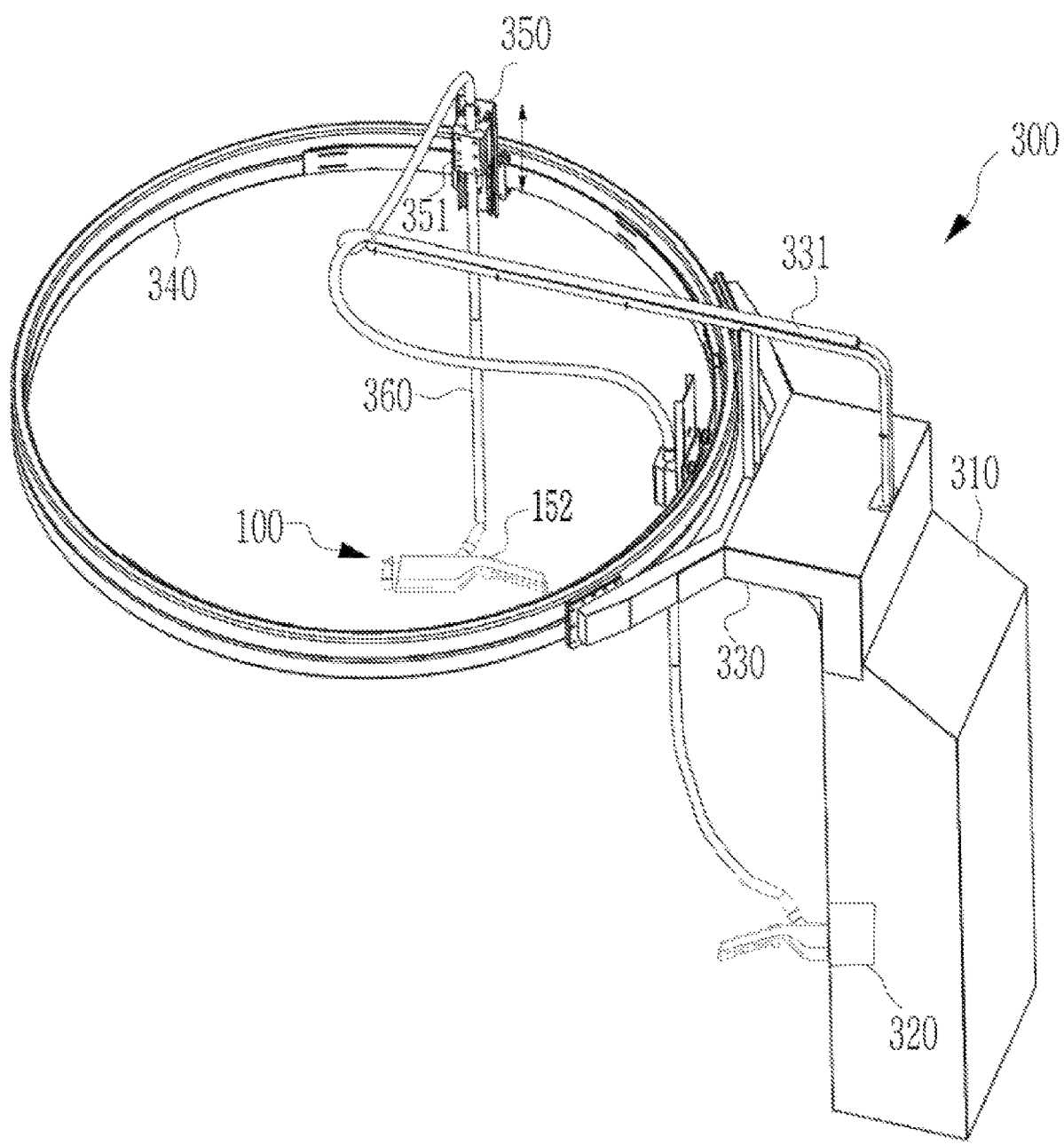
FIG. 4 is a schematic diagram illustrating a configuration of an electric vehicle charging apparatus including an electric vehicle charging coupler according to another embodiment of the present invention.

FIG. 4 is a schematic diagram illustrating a configuration of an electric vehicle charging apparatus including an electric vehicle charging coupler according to another embodiment of the present invention.

Referring to FIG. 4, an electric vehicle charging apparatus 300 according to another embodiment of the present invention includes a charging main body 310, a mounting bracket 330, a circular rail 340, a driving body 350, a charging cable 360, and a charging coupler 100.

The charging main body 310 is formed with a predetermined height and installed to stand on the ground. A power supply module for supplying charging power is embedded in the charging main body 310. Further, a coupler accommodation box 320 is provided in the charging main body 310. When charging is not performed, the charging coupler 100 is accommodated in the coupler accommodation box 320.

In addition to a card reader (not shown) for paying a charging fee with a credit card, various control buttons for controlling operations of the electric vehicle charging apparatus 300, such as a button (not shown) for selecting a charging type of the electric vehicle which will be charged, an emergency button (not shown) for interrupting charging in an emergency situation, and the like are provided on a front surface of the charging main body 310.

The mounting bracket 330 is installed on an upper portion of the charging main body 310, and the circular rail 340 is installed on the mounting bracket 330. A cable cradle 331 is formed above the mounting bracket 330 such that the charging cable 360 drawn out from the charging main body 310 to the outside is mounted on the cable cradle 331. The cable cradle 331 is formed to extend toward a center of the circular rail 340.

The driving body 350 is movably installed on the circular rail 340 and moved to a stop position of the electric vehicle. That is, the driving body 350 transfers the charging cable 360 to a position of the charging port of the electric vehicle according to the stop position of the electric vehicle.

When the user holds and pulls the charging coupler 100 to perform charging, the driving body 350 is installed to be manually transferred in front of the electric vehicle which is parked or installed to be automatically transferred upon pressing of an automatic reel transfer button (not shown) provided on the front surface of the charging main body 310 by the user.

A height adjustment part 351 which vertically ascends or descends is coupled to the driving body 350, and the charging cable 360 is connected to the height adjustment part 351. Therefore, when the height adjustment part 351 descends, the charging coupler 100 connected to a distal end of the charging cable 360 also descends, and, when the height adjustment part 351 ascends, the charging coupler 100 also ascends.

The charging cable 360 transmits the DC power supplied from the charging main body 310 to the electric vehicle. Since a high current passes through the charging cable 360 for fast charging and thus high heat is generated, a flow path through which a refrigerant for cooling flows is additionally embedded in the charging cable 360 so that the charging cable 360 becomes thick and heavy.

The thick and heavy charging cable 360 is easily transferred to a position of the charging port without a large effort due to the driving body 350 installed on the circular rail 340. That is, since the charging cable 360 is installed to have a structure which descends from the upper side, the user may easily transfer the charging cable 360 to the charging port of the electric vehicle without lifting or bending the charging cable 240.

The charging coupler 100 is connected to the distal end of the charging cable 360 and has the handle 150 which is formed separately from the cable inlet part 130 through which the charging cable 360 is inserted. A configuration of the charging coupler 100 is the same as that described with reference to FIG. 1, and, since the electric vehicle charging apparatus 300 illustrated in FIG. 4 is dedicated to DC power charging, only the communication terminal of the second port 114 of the charging coupler 100 is used.

The height adjustment button 152 is provided on the charging coupler 100 so as to move the charging coupler 100 up or down such that a height of the charging port of the electric vehicle is aligned with a height of the charging coupler 100. The user operates the height adjustment button 152 to finely adjust a height of the charging coupler 100 by vertically moving the height adjustment part 351 coupled to the driving body 350 up or down. That is, it is possible to finely adjust the height of the charging coupler 100 according to a position of the charging port which is different in height for each electric vehicle by operating the height adjustment button 152.

In accordance with an electric vehicle charging coupler having a handle and an electric vehicle charging apparatus including the same according to the present invention, a user can easily mount a charging coupler to a charging port of an electric vehicle by easily adjusting a mounting angle of the charging coupler using a handle which is formed separately from a charging cable inlet part.

Further, since the charging cable is installed to have a structure which descends from an upper side, the user can easily transfer the charging cable without a large effort to lift or bend the charging cable.

Further, a height adjustment button provided on the charging coupler is operated such that the charging coupler can be exactly mounted to the charging port by adjusting a charging height with one hand without handling the heavy and thick charging cables with both hands.

The above-described description of the present invention is intended only for an illustrative purpose, and it can be easily understood that other concrete forms can be devised by those skilled in the art without changing or modifying the technical spirit or essential characteristics of the present invention.

Therefore, it should be understood that the above-described embodiments are not restrictive but illustrative in all aspects. For example, each component described as a single form may be distributed and implemented, and similarly, components described as being distributed may also be implemented in a combined form.

The scope of the present invention is defined by the appended claims rather than the detailed description, and it should be construed that all alternations or modifications derived from the meaning and scope of the appended claims and the equivalents thereof fall within the scope of the present invention.

What is claimed is:

1. An electric vehicle charging coupler comprising:
    a coupler body comprising a first end part opposite to a second end part in a longitudinal direction of the coupler body, wherein a charging port is disposed on the first end part and mounted to a charging port of an electric vehicle for charging;

a cable inlet part disposed on an adjacent area of the second end part of the coupler body and into which a charging cable is inserted; and a handle connected to the second end part of the coupler body to be held by a hand, wherein the handle includes:

a height adjustment button configured to move the charging coupler up or down; and a lock button configured to operate a locker when the charging coupler is mounted to the charging port of the electric vehicle.

2. The electric vehicle charging coupler of claim 1, wherein the cable inlet part includes a protruding part exposed from the coupler body and that protrudes from the second end part of the coupler body.

3. The electric vehicle charging coupler of claim 2, wherein a part of the charging cable is covered by the protruding part of the cable inlet part.

4. The electric vehicle charging coupler of claim 2, wherein a first angle between the longitudinal direction of the coupler body and a longitudinal direction of the cable inlet part is greater than a second angle between a longitudinal direction of the handle and the longitudinal direction of the cable inlet part.

5. The electric vehicle charging coupler of claim 4, wherein the charging port includes a direct current (DC) power charging port and an alternating current (AC) power charging port, wherein the direct current (DC) power charging port is adjacent to the alternating current (AC) power charging port in a first direction of the coupler body that intersects with the longitudinal direction of the coupler body.

6. The electric vehicle charging coupler of claim 5, wherein the direct current (DC) power charging port includes a plus (+) terminal and a minus (−) terminal, and wherein the alternating current (AC) power charging port includes two AC power terminals, a proximity sensing terminal, a ground (GND) terminal, and a communication terminal for communicating with the electric vehicle.

7. The electric vehicle charging coupler of claim 6, wherein the locker is disposed on the first end part of the coupler body, wherein the alternating current (AC) power charging port is located between the direct current (DC) power charging port and the locker in the first direction.

8. The electric vehicle charging coupler of claim 7, wherein a width of the direct current (DC) power charging port is greater than a width of the alternating current (AC) power charging port in a second direction that intersects with the first direction and the longitudinal direction of the coupler body, and wherein a width of the locker is smaller than the width of the alternating current (AC) power charging port in the second direction.

\* \* \* \* \*